Patented Apr. 12, 1938

2,114,123

UNITED STATES PATENT OFFICE 2,114,123

AMORPHOUS PRECIPITATED SILICA AND METHOD OF PREPARATION THEREOF

Ralph V. Heuser, Mount Vernon, N. Y., assignor to American Cyanamid Company, New York, N. Y., a corporation of Maine No Drawing. Application November 1, 1935, Serial No. 47,815

1 Claim. (Cl. 23—182)

The present invention relates to an amorphous silica and its preparation from alkali silicate solutions. More particularly, it concerns a simple and rapid method for the production of hydrated silica in the form of a soft and voluminous powder by means of reagents which are inexpensive and readily available.

The product of this invention is entirely distinct from another form of hydrated silica known commercially under the name of silica gel, and it is important not to confuse it with the latter. Silica gel is usually supplied in a granulated form, and is distinguished by hardness, high density and fine pore size of the individual granules. The amorphous silica prepared according to the present method is a very light, soft, velvety and non-gritty powder. Its pores are of larger dimensions than those of silica gel.

As a result of the different pore size, these two materials exhibit marked differences in specific and total adsorptive power. Silica gel adsorbs readily condensible gases and vapors even in comparatively low concentrations of gaseous mixtures. The total adsorptive capacity of silica gel for such gases and vapors is, however, comparatively small. Thus a commercial grade of silica gel may adsorb at medium degrees of atmospheric humidity from 20 to 25 percent of its weight of water, but it will not adsorb more than approximately 40 percent of its weight of water even if the air, to which it is exposed, is completely saturated with water.

The larger pore size of the product of this invention is evidenced by its smaller specific adsorptivity and its larger total adsorptivity when compared with silica gel. Thus it will adsorb at medium degrees of atmospheric humidity usually less than 15 percent of its weight of water and from air saturated with moisture it will generally adsorb over 100 percent of its weight of water. It is even capable of adsorbing 200 percent of water without appearing wet to the touch. This high degree of adsorptivity for water vapor corresponds also to a high adsorptivity of the product of this invention for the vapors of other substances which are liquid or solid at ordinary temperature and it is this property which will assure an extended field of applicability for the amorphous, hydrated silica.

In other words, this form of hydrated silica is more suitable as a filler and absorbent of aqueous, oily, waxy and gummy substances, than as an adsorption agent in the recovery of solvents from waste gases, air conditioning and similar uses where a product of granular nature and finer pore size will prove to be more suitable. On the other hand, the ability of the product of this invention in absorbing large quantities of aqueous and oily liquids without becoming wet or pasty, when taken in conjunction with its other properties, renders its application advantageous as a carrier for catalytic agents, as well as for insecticidal, fungicidal, bactericidal ingredients and as a base or filler in rubber products, pigments, paints, linoleum, enamels, synthetic resins, lakes, cosmetics, tooth pastes, flooring and roofing compositions, refractories and as a reaction retardant in various dry mixtures, or, in fact in any other application where the properties of large surface extension and large pore size are of outstanding importance. In these and similar uses, the product is superior to natural siliceous materials, such as diatomite, kieselguhr, fuller's earth, etc., when compared on the basis of color, absence of non-siliceous impurities, uniformity, porosity and much higher retentiveness for viscous, gummy or oily substances.

In common with the preparation of silica gel, a soluble silicate, such as sodium silicate, serves as a raw material for the production of amorphous silica according to the present invention. The mode of treatment, as well as a reagent employed for the precipitation of the hydrated silica, determines the character of the resulting reaction product.

In the production of silica gel of fine pore dimensions, it is important to effect the precipitation under quiescent conditions which insure the formation of a silica hydrosol as a preliminary step. During this quiescent stage, which may last from several minutes to several hours, the silica hydrosol very gradually loses a part of the large number of adsorbed water molecules until the critical point is reached when the hydrosol complex becomes insoluble and changes to a hydrogel. The longer this quiescent stage is extended, by the control of various factors, the finer are the pores of the resulting silica gel.

In the preparation of amorphous silica according to the present invention, the hydrosol stage is reduced to as short a time as practicable, usually, to a fractional part of a second. This object is obtained by utilizing the dehydrating effect of a strong salt solution upon the hydrosol, whereby a rapid withdrawal of adsorbed water molecules takes place, concomitant with gel formation. This effect may be enhanced to a considerable extent by agitation.

It has been found by this applicant that a solution of an ammonium salt is very suitable for the precipitation of amorphous hydrated silica of the desired properties. A solution of an ammonium salt, when used in not too low a concentration, not only is an effective precipitation agent for silicate solutions, but it is also susceptible of functioning as a dehydrating agent in conformity with the above explained principle of precipitation.

The best results are obtained by adding the silicate solution gradually and with good stirring to the ammonium salt solution, and not vice versa. When employing ammonium sulfate, for example, it is believed the following reaction takes place:

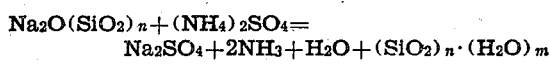

$$Na_2O(SiO_2)_n + (NH_4)_2SO_4 = Na_2SO_4 + 2NH_3 + H_2O + (SiO_2)_n \cdot (H_2O)_m$$

From this reaction, it will be seen that sodium sulfate is formed substantially at the rate at which the ammonium sulfate disappears gradually by the successive or continuous addition of sodium silicate. Consequently, the silica liberated is at all stages of the reaction in contact with a salt solution, whether that of ammonium sulfate or sodium sulfate. Both of these salts are susceptible of functioning as dehydrating agents for the hydrosol complex, and, hence, the accumulation of hydrosol is prevented.

In place of sodium silicate, other soluble silicates, such as potassium silicate, may be used. Any ammonium salt or a salt of an ammonium derivative capable of forming a salt with an acid or acidic material in the proper concentration is satisfactory. For economic and other reasons, sodium silicate with a $SiO_2/Na_2O$ ratio of at least 3:1, and ammonium sulfate are preferred.

The process may be explained by way of an example, which is as follows:

A solution of 18 lbs. of ammonium sulfate dissolved in 150 lbs. of water, is stirred rapidly while a solution of 84.5 lbs. of sodium silicate of 41° Bé. (containing $SiO_2$ and $Na_2O$ in the approximate ratio of 3.2/1), diluted with 60 lbs. of water, is added gradually in the course of 45 to 60 minutes. The precipitation of hydrated silica takes place at ordinary temperature immediately, and as the addition of the sodium silicate solution is continued, a heavy, creamy precipitate is formed. The rate of adding the silicate solution may be increased during the precipitation as the number of precipitation centers provided by the precipitate formed increases. The silica available in the silicate solution is practically quantitatively recovered hereby, which is an unexpected result in view of the fact that ammonia, in the absence of electrolytes, is known to exert a solubilizing effect on hydrated forms of silica, especially at elevated temperatures.

The suspension obtained is filtered and washed free from sodium sulfate and ammonia. Since the precipitate retains by adsorption a small quantity of alkali, which is not detrimental to some of its uses, the resulting product need not be further purified for some uses. If, however, a purer product is desired, it may be obtained by triturating the filter cake with water containing the requisite amount of an acid, preferably acetic acid, or an ammonium salt of a weak acid, such as ammonium acetate, etc., for effecting the necessary neutralization. In that event, the slurry is preferably refiltered and rewashed. Surplus water may be removed from the filter cake by centrifuging, but in view of the desirability of recovering the ammonia from the mother liquor the initial filtration and washing is preferably effected in filter presses. The ammonia may be recovered from the mother liquor in any known manner.

The washed filter cake may be dried at comparatively low temperature, preferably at 40 to 70° C., and the dried material is then passed through crushing rolls, a ball mill, or the like, for reducing any agglomerates to the state of a fine powder, that is, to separate the agglomerates into the initially discrete particles of which they are composed. Usually the particle size of the product ranges from .5 to 5 microns. In this form, the product is a pure white, impalpable, fluffy and non-gritty powder. Its lightness may be judged by the fact that its weight ranges from 10 to 15 lbs., per cubic foot compared to considerably over 15 lbs. per cubic foot for those commercial forms of hydrated silica of which this applicant is aware. Under high magnification the individual particles appear to be of a globular shape.

The particle size of the finished silica and its physical form may be controlled, within certain limits, by the degree of agitation imparted to the reaction mixture during the precipitation. An agitation insuring an effective stirring of the suspension, rather than a violent beating action, promotes the formation of finer particles, while violent agitation tends to promote the formation of particles of larger dimensions and of a more crystalline character.

The U. S. patent to Max Yablick, 1,687,919 describes a process for the production of a silica gel, suitable for the adsorption of gases and vapors. The patentee teaches that by treating diluted sodium silicate with a dilute ammonium carbonate solution, a silicic acid colloid is produced which will set to a stiff jelly. This procedure is dependent on the employment of much weaker solutions of the reagents than are indicated for the present invention. As a consequence, a silica gel is first produced and upon drying a product is obtained having a small pore texture and a hard and glassy nature. The process of this invention, on the contrary, proposes the use of reagents in such concentrations that a dehydrating effect will be obtained so that the silica passes through the hydrosol stage as nearly instantaneously as possible, the gel stage is substantially avoided by agitation, and consequently, the product is precipitated as a finely pulverulent or semi-flocculent hydrated silica which, on drying, does not coalesce, but may be converted into a very soft, impalpable powder.

While a specific example has been set forth herein, yet it is to be understood that there may be a considerable variation from the conditions specified, without departing from the spirit of the invention.

I claim:

A method of producing an amorphous, non-coalescent, non-gelatinous, precipitated silica in the form of a white, impalpable powder, having a larger pore size than a silica gel, characterized by its ability to adsorb 100% or more of its weight of water from air saturated with moisture at ordinary temperatures and having generally a smaller specific adsorptivity than silica gel, which consists in adding a solution of an alkali metal silicate to a solution of an ammonium salt under such conditions that the silica is initially liberated in contact with the said ammonium salt, and at later stages in contact with a salt resulting from metathesis of the alkali metal silicate and the ammonium salt, in sufficient concentration to function as a dehydrating agent, to prevent the accumulation of substantial quantities of a hydrosol, the silica being precipitated at ordinary temperatures, filtering the precipitate, treating the same with an acid material to remove alkalinity washing and then drying the washed precipitate at a temperature, of from 40 to 70° C. without decomposition.

RALPH V. HEUSER.